(12) United States Patent
Migliavacca (10) Patent No.: US 9,309,611 B2
(45) Date of Patent: Apr. 12, 2016

(54) REINFORCED TEXTILE SUPPORT WITH CELLULOSIC FIBER MULTI-FILAMENTS, PARTICULARLY FOR BITUMINOUS MEMBRANES

(75) Inventor: Massimo Migliavacca, Milan (IT)

(73) Assignee: POLITEX S.A.S. DI FREUDENBERG POLITEX S.R.L., Milan (IT)

( * ) Notice: Subject to any disclaimer, the term of this patent is extended or adjusted under 35 U.S.C. 154(b) by 71 days.

(21) Appl. No.: 13/823,780

(22) PCT Filed: Nov. 10, 2011

(86) PCT No.: PCT/EP2011/069859
§ 371 (c)(1),
(2), (4) Date: Mar. 15, 2013

(87) PCT Pub. No.: WO2012/065903
PCT Pub. Date: May 24, 2012

(65) Prior Publication Data
US 2013/0177754 A1    Jul. 11, 2013

(30) Foreign Application Priority Data
Nov. 15, 2010   (IT) .............................. MI2010A2107

(51) Int. Cl.
*D04H 1/74*    (2006.01)
*E04D 5/02*    (2006.01)
(Continued)

(52) U.S. Cl.
CPC .. *D04H 1/74* (2013.01); *B32B 5/02* (2013.01); *B32B 5/022* (2013.01); *B32B 5/06* (2013.01); *B32B 5/26* (2013.01); *B32B 5/28* (2013.01); *D04H 1/4258* (2013.01); *D04H 1/435* (2013.01); *D04H 1/488* (2013.01); *D04H 1/49* (2013.01); *D04H 3/04* (2013.01); *D04H 5/02* (2013.01); *D04H 13/002* (2013.01); *D04H 13/005* (2013.01); *D04H 13/006* (2013.01);
(Continued)

(58) Field of Classification Search
CPC ............ D04H 1/74; D04H 5/02–5/04; D04H 13/002–13/006; B32B 5/26; B32B 5/28; B32B 5/02; E04D 5/02; E04D 5/10; E04D 1/20; D04D 1/20; D06N 5/003; Y10T 442/646
USPC .......................................... 428/219; 442/369
See application file for complete search history.

(56) References Cited

U.S. PATENT DOCUMENTS 5,118,550 A    6/1992  Baravian et al.
5,856,243 A *  1/1999  Geirhos et al. .................. 442/57
(Continued)

OTHER PUBLICATIONS

International Search Report issued Feb. 28, 2012 in International (PCT) Application No. PCT/EP2011/069859.
(Continued)

*Primary Examiner* — Aaron Austin
*Assistant Examiner* — Jasper Saberi
(74) *Attorney, Agent, or Firm* — Wenderoth, Lind & Ponack, L.L.P.

(57) ABSTRACT

A reinforced textile support, particularly for bituminous membranes, made of at least one layer of polyester non woven web and continuous high modulus reinforcement yarns longitudinally set with respect to said layer. The reinforcement yarns consist of cellulosic fiber multi-filaments of the Lyocell type. The assembly is bound by mechanical needling or water entangling, stabilized by means of thermal treatment at a temperature of 200-250° C. and consolidated by means of a chemical binder.

11 Claims, 11 Drawing Sheets

Lay-out of bituminous membrane support.

(51) Int. Cl.
  *D06N 5/00*    (2006.01)
  *E04D 5/10*    (2006.01)
  *E04D 1/20*    (2006.01)
  *B32B 5/02*    (2006.01)
  *B32B 5/06*    (2006.01)
  *B32B 5/26*    (2006.01)
  *B32B 5/28*    (2006.01)
  *D04H 1/4258*  (2012.01)
  *D04H 1/435*   (2012.01)
  *D04H 1/488*   (2012.01)
  *D04H 3/04*    (2012.01)
  *D04H 5/02*    (2012.01)
  *D04H 13/00*   (2006.01)
  *D04H 1/49*    (2012.01)

(52) U.S. Cl.
  CPC ............ *D06N 5/003* (2013.01); *E04D 1/20* (2013.01); *E04D 5/02* (2013.01); *E04D 5/10* (2013.01); *B32B 2250/03* (2013.01); *B32B 2250/20* (2013.01); *B32B 2250/40* (2013.01); *B32B 2260/023* (2013.01); *B32B 2260/046* (2013.01); *B32B 2262/0284* (2013.01); *B32B 2262/04* (2013.01); *B32B 2274/00* (2013.01); *B32B 2305/08* (2013.01); *B32B 2305/20* (2013.01); *B32B 2307/734* (2013.01); *B32B 2419/06* (2013.01); *Y10T 442/646* (2015.04)

(56) References Cited

U.S. PATENT DOCUMENTS

| | | | |
|---|---|---|---|
| 6,131,351 | A | 10/2000 | Locatelli |
| 6,555,678 | B1 * | 4/2003 | Allandrieu ............. D01F 2/24 536/124 |
| 6,983,779 | B2 | 1/2006 | Kwon et al. |
| 2007/0251624 | A1 * | 11/2007 | Han et al. ............ 152/451 |
| 2010/0015425 | A1 * | 1/2010 | Bindschedler ........ B32B 5/26 428/219 |
| 2011/0223402 | A1 * | 9/2011 | Gamert et al. ........ 428/219 |

OTHER PUBLICATIONS

International Preliminary Report on Patentability issued Nov. 7, 2012 in International (PCT) Application No. PCT/EP2011/069859.
Written Opinion issued Feb. 28, 2012 in International (PCT) Application No. PCT/EP2011/069859.

* cited by examiner

Fig. 1: Lay-out of bituminous membrane support.

Fig. 2: Comparison of load-strain curves of mechanical tests at room temperature of specimens reinforced with glass yarns and Lyocell 1650 (NW of PET staple fibres). The chart on the right side is an enlargement of the chart on the left in the 0-5% strain range.

Fig. 3: Comparison of load-strain curves of mechanical tests at 180 °C of specimens reinforced with glass yarns and Lyocell 1650 (NW of PET staple fibres). The chart on the right side is an enlargement of the chart on the left in the 0-5% strain range.

Fig. 4: Comparison of load-strain curves of mechanical tests at room temperature of specimens reinforced with glass yarns and Lyocell 1100 (NW of continuous PET filaments). The chart on the right side is an enlargement of the chart on the left in the 0-7% strain range.

Fig. 5: Comparison of load-strain charts of mechanical tests at 180°C of specimens reinforced with glass yarns and Lyocell 1100 (NW of continuous PET filaments). The chart on the right side is an enlargement of the chart on the left in the 0-5% strain range.

Fig. 6a: Traction tests on 10 specimens of Vetrotex 68 tex yarns.

Fig. 6b: Enlargement of the chart in Fig. 6a in the 0-1.5% strain range.

Fig. 7a: Traction tests on 10 specimens of Lyocell 1100 yarns (Hyosung).

Fig. 7b: Enlargement of the chart in Fig. 7a in the 0-3% strain range.

Fig. 8a: Traction tests on 10 specimens of Lyocell 1650 yarns (Hyosung).

Fig. 8b: Enlargement of the chart in Fig. 8a in the 0-3% strain range.

REINFORCED TEXTILE SUPPORT WITH CELLULOSIC FIBER MULTI-FILAMENTS, PARTICULARLY FOR BITUMINOUS MEMBRANES

The present invention relates to a textile support suitable for waterproofing bituminous membranes.

The supports for bituminous membranes used for waterproofing roofs must satisfy many technical requirements.

Firstly, the supports must have mechanical properties suitable to support the stresses to which they are subjected during the impregnation with bitumen and during the subsequent installation of the finished membranes on the roofs.

Furthermore, the supports must have excellent dimensional stability to mechanical and thermal stress, especially during the bitumen saturation process and during the lifecycle of the membranes on the roof, when the supports are subjected to a critical temperature range.

In this regard, it is known the technique of coupling one or more synthetic fiber textile substrates with continuous high modulus yarns, e.g. made of glass or other mineral materials, either natural or synthetic, set in the longitudinal sense (U.S. Pat. No. 5,118,550; U.S. Pat. No. 4,539,254; U.S. Pat. No. 6,131,351; EP 0806509).

The textile substrates and the reinforcement yarns are joined by means of mechanical needling or water entangling and consolidated using a chemical binder.

In other configurations, on the contrary, consolidation occurs thermally by melting a low-melting component added to the substrate in the form of fibers or filaments (U.S. Pat. No. 4,504,539).

The known techniques allow to obtain supports with good stiffness and dimensionality stability, to either avoid or reduce shrinkage during the production process or during the lifecycle of the membranes.

In particular, glass reinforcement yarns are widely used for its performance, related to its high elastic modulus, and for its low cost. However, the use of glass reinforcement yarns has many drawbacks.

Glass is fragile and the yarns are subject to break both during coupling and mostly during the needling process.

The fracture, and thus the lack of even only one reinforcement yarn, causes important faults in the finished product (bituminous membrane), if the missing reinforcement yarn is not detected and the faulty support is used. Indeed, the polyester substrate portion between the two yarns adjacent to the missing one (double clear distance between two subsequent yarns) is weakened and consequently subjected to structural failure during the bitumen impregnation process (such as thinning, formation of folds etc.).

If the fracture of a reinforcement yarn is detected, considerable amounts of supports of lower quality are produced with severe economic damage, because of high production speed of the supports and response time of the restoring procedures.

As a result of the low elasticity of the glass, which has an elongation at break of about 2.5-3.5%, the reinforcement yarns do not increase the mechanical properties of the support in the longitudinal sense.

Artificial fibers derived from cellulose, such as viscose, cellulose acetate or other modified cellulosic fibers, are not currently used for the reinforcement yarns of textile supports for bituminous membranes.

From U.S. 200401265677 and U.S. Pat. No. 6,983,779 it is known the use of a multi-filament fiber named "Lyocell" which is used as reinforcement for tires subjected to thermal stress in the range from 60 to 80° C., for which the mechanical properties of the cellulosic fibers in relation to humidity absorption are of particular interest. However, the use of cellulosic fibers for products subjected to much higher thermal stress, such as that deriving from the immersion of reinforced textile supports in hot bitumen (180-200° C.) for the production of bituminous membranes for roofing, are not known.

According to the state of the art, the purpose of the present invention is to make a reinforced textile support for bituminous membranes, which can overcome the drawbacks described above connected to the use of glass yarns.

According with the present invention, this purpose is reached with a textile support composed of at least one layer of non woven web of synthetic fibers, and continuous high modulus reinforcement yarns, longitudinally set with respect to said layer, that are made of filaments of cellulosic fibers.

Each layer of non woven web is made of continuous polyester filaments (spun bond) or staple fibers made of the same material, with a linear density between 0.5 and 6 dtex, rather between 2.5 and 5 dtex.

The reinforcement yarns of cellulosic fibers, preferably constituted by multi-filaments of the Lyocell type described in U.S. 20040126577 and U.S. Pat. No. 6,983,779, are laid on a non woven web layer or sandwiched between two layers.

These yarns have a Young modulus higher than 5 GPa, preferably higher than 20 GPa.

The assembly, made up of layers of non woven web and reinforcement yarns, is bound by means of mechanical needling, with needling density between 20 and 150 stitches/$cm^2$, or water entangling and then stabilized with a thermal treatment at the temperature of 200-250° C., rather between 220 and 240° C., by calendaring or in hot air oven (air-through) and finally consolidated using a chemical binder, in particular with acrylic, styrol-butadiene, vinyl resins etc., possibly mixed with resins derived from vegetable starches or cellulose, in a content comprised between 10 and 30% by weight.

The support thus obtained has many advantages.

Mainly, the support is free from possible fractures of the reinforcement yarns, and thus from consequents failures.

During the mechanical consolidation process, it is also possible to use needles with very high fiber carrying efficiency and/or to increase the needling density within wide limits, obtaining supports with better mechanical properties, without weakening due to the break of the reinforcement yarns.

The yarns described in the present invention have significantly lower density than the glass (1.5 $g/cm^3$ vs. 2.6 $g/cm^3$), allowing to obtain less added weight, with the same length and unitary titer; because the reinforcement yarns are purchased by weight, the lower density translates into lower costs.

Thanks to the higher tenacity compared to glass, the Lyocell yarns may be formed with a considerably lower number of twists per linear meter. This translates into an increase of the contact surface between yarn and non woven web, due to the fact that the single filaments can split during the matrix-reinforcement coupling.

Consequently, the greater contact surface deriving from the lower density and lower number of twists lead to the increase of adhesion of reinforcement yarns to the matrix, thus obtaining a better efficiency with respect to glass. The greater adhesion allows better performance in terms of mechanical and thermal strength (the filaments of cellulosic fibers are not thermoplastic) and of dimensional stability.

Furthermore, the polymeric nature of Lyocell yarns and the presence of functional groups (—OH) facilitates the formation of stable chemical bonds with some families of resins widely used in the chemical consolidation process. In the case of glass reinforcement yarns, such objective is reached with costly additives (silanes), added in the sizing formulation applied during the formation of the filaments.

The result obtained, according with the advantages described above, is a considerable increase of dimensional stability, thanks to the increase of the modulus at 180° C. to values of 1000-1600 daN by linear meter, compared to 80-100 daN obtained with fiber reinforcements disclosed in U.S. Pat. No. 5,118,550.

EXAMPLE 1

Figure 1:
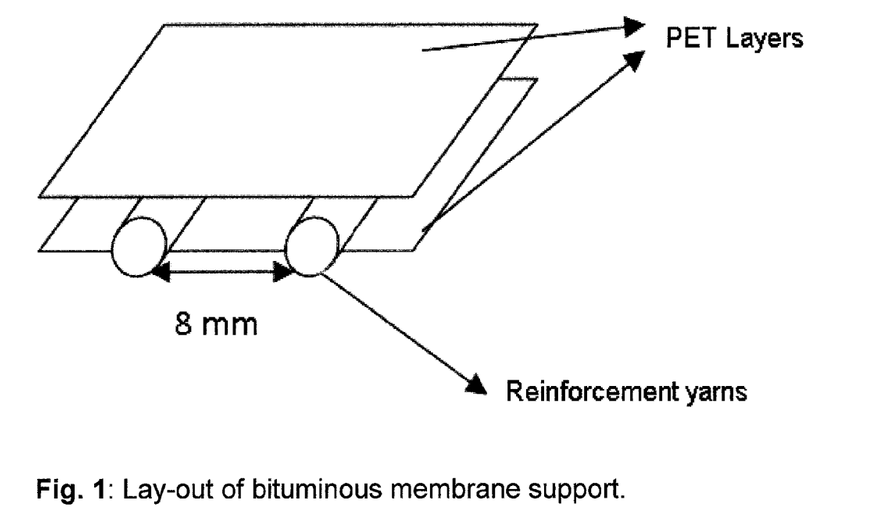
FIG. 1 shows a diagrammatic illustration of the support for bituminous membrane.

A support for bituminous membrane was produced with two layers of PET staple fiber non woven web of linear density equal to 4 dtex joined with two yarns of Lyocell 1650, 180 tex titer, supplied by Hyosung, set in between and longitudinally at a reciprocal distance of 8 mm, as shown in FIG. 1.

The support was needled using Grotz Becker needles 15×18×38×3 CB with 11 mm penetration and needling density of 110 cm/m$^2$, impregnated with a styrol-butadiene resin and cured in an oven at 220° C.

The total weight of the support is 157 g/m$^2$ and the resin content is equal to 17.5% of the finished product.

The support was analyzed according to standard ISO 9073, to determine its mechanical properties at room temperature. Furthermore, 50×180 mm size specimens were taken for carrying out tensile tests in hot chamber at 180° C.

Figure 2:
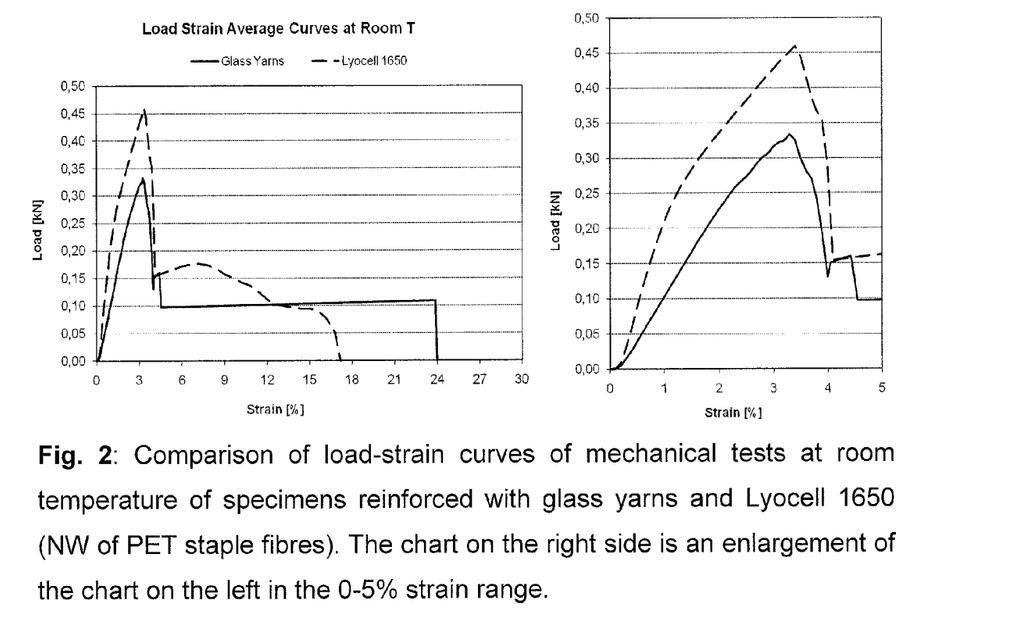
FIG. 2 shows a comparison of force-strain charts of mechanical tests at ambient temperature of specimens reinforced with glass threads and Lyocell 1650.

The results of tensile tests at room temperature are shown in FIG. 2 and in Tab. 1: the curves, obtained as an average of 5 specimens, show the comparison with similar support reinforced with Vetrotex 68 tex glass yarns.

TAB. 1

Results of tensile tests at room temperature of the specimens in FIG. 2

|  | Glass | Lyocell |
|---|---|---|
| Grammage [g/m$^2$] | 145 | 157 |
| Yarn tensile strength [N/50 mm] | 338 | 477 |
| Yarn elongation at break [%] | 3.4% | 3.6% |
| Load @ strain = 2% [N/50 mm] | 226 | 334 |
| Tenacity at yarn break [N/50 mm/g*m$^2$] | 0.234 | 0.305 |
| Composite Young modulus [MPa] | 148 | 288 |

Figure 3:
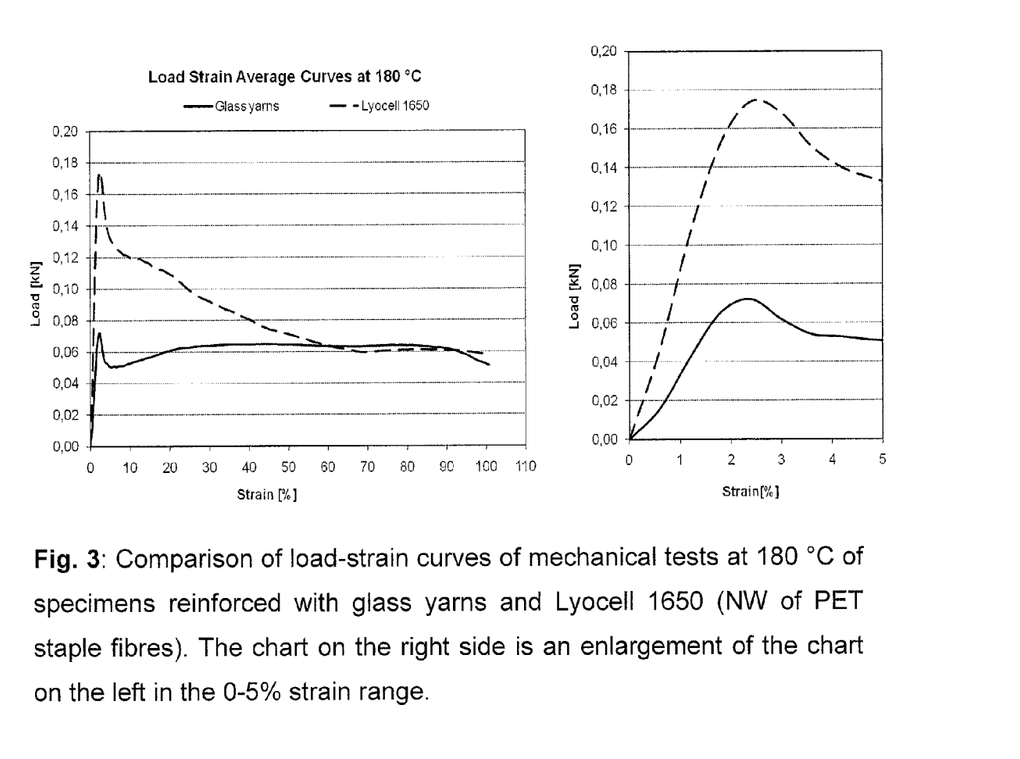
FIG. 3 shows a comparison of force-strain charts of mechanical tests at 180° C. of specimens reinforced with glass threads and Lyocell 1650.

FIG. 3 and Tab. 2 show the results of tensile tests at 180° C.: the curves, again obtained as an average of the 5 specimens, show the difference with similar support reinforced with Vetrotex 68 tex glass yarns.

TAB. 2

Results of tensile tests at 180° C. of the specimens in FIG. 3.

|  | Glass | Lyocell |
|---|---|---|
| Grammage [g/m$^2$] | 141 | 157 |
| Yarn tensile strength [N/50 mm] | 74 | 177 |
| Yarn elongation at break [%] | 2.21% | 2.55% |
| Tenacity at yarn break [N/50 mm/g*m$^2$] | 0.05 | 0.11 |
| Young modulus [MPa] | 49 | 104 |
| Strain @ Load = 50 N | 1.38% | 0.68% |
| Strain @ Load = 80 N | — | 0.95% |
| Strain @ Load = 100 N | — | 1.15% |

EXAMPLE 2

Continuous filaments of PET were produced with linear density 3.3 dtex, arranged to form two random webs of width 3.5 m, inserting Lyocell 1100 yarns, 120 tex titer, supplied by Hyosung, longitudinally set at a reciprocal distance of 8 mm (FIG. 1).

The support was needled using Grotz Becker needles 15×18×38×3 CB with 13 mm penetration and needling density of 91 cm/m$^2$, impregnated with a styrol-butadiene resin and cured in an oven at 200° C.

The total weight of the support is 204 g/m$^2$ and the resin content is equal to 23% of the finished product.

The support was analyzed according to standard ISO 9073, to determine mechanical properties at room temperature. Furthermore, 50×180 mm size specimens were taken for carrying out tensile tests in hot chamber at 180° C.

Figure 4:
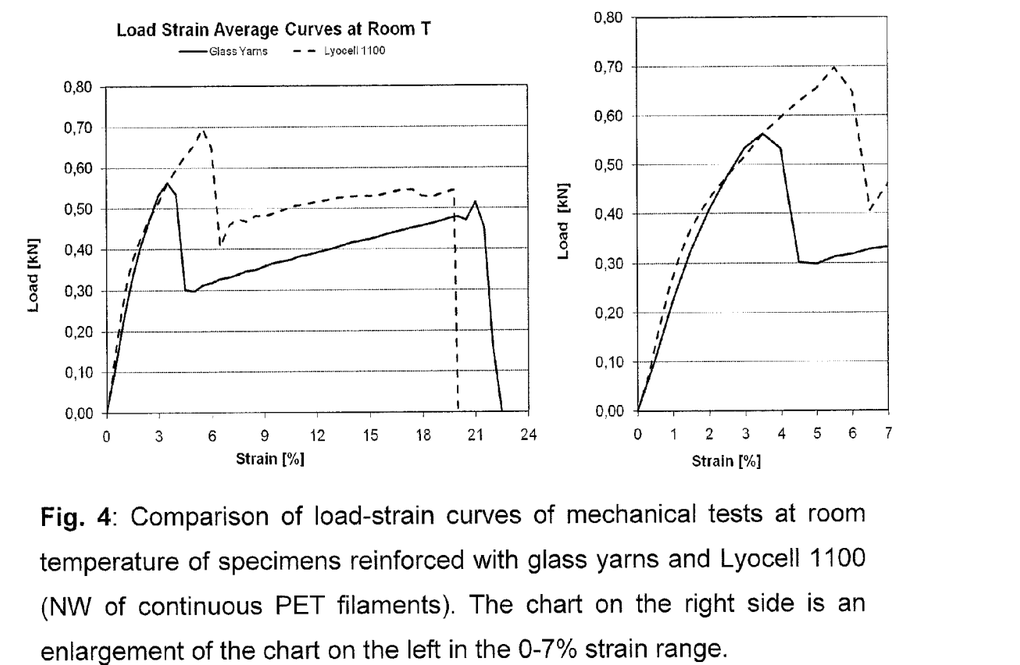
FIG. 4 shows a comparison of force-strain charts of mechanical tests at ambient temperature of specimens reinforced with glass threads and Lyocell 1100.

The results of tensile tests at room temperature are shown in FIG. 4 and in Tab. 3: the curves, obtained as an average of 5 specimens, show the comparison with similar support reinforced with Vetrotex 68 tex glass yarns.

TAB. 3

Results of tensile tests at room temperature of the specimens in FIG. 4.

|  | Glass | Lyocell |
|---|---|---|
| Grammage [g/m$^2$] | 197 | 204 |
| Yarn tensile strength [N/50 mm] | 576 | 688 |
| Yarn elongation at break [%] | 3.9% | 5.8% |
| Composite tensile strength [N/50 mm] | 526 | 525 |
| Composite elongation at break [%] | 24.8% | 18.8% |
| Load @ strain = 2% [N/50 mm] | 409 | 431 |
| Tenacity at yarn break [N/50 mm/g*m$^2$] | 0.294 | 0.338 |
| Composite Young modulus [MPa] | 337 | 464 |

Figure 5:
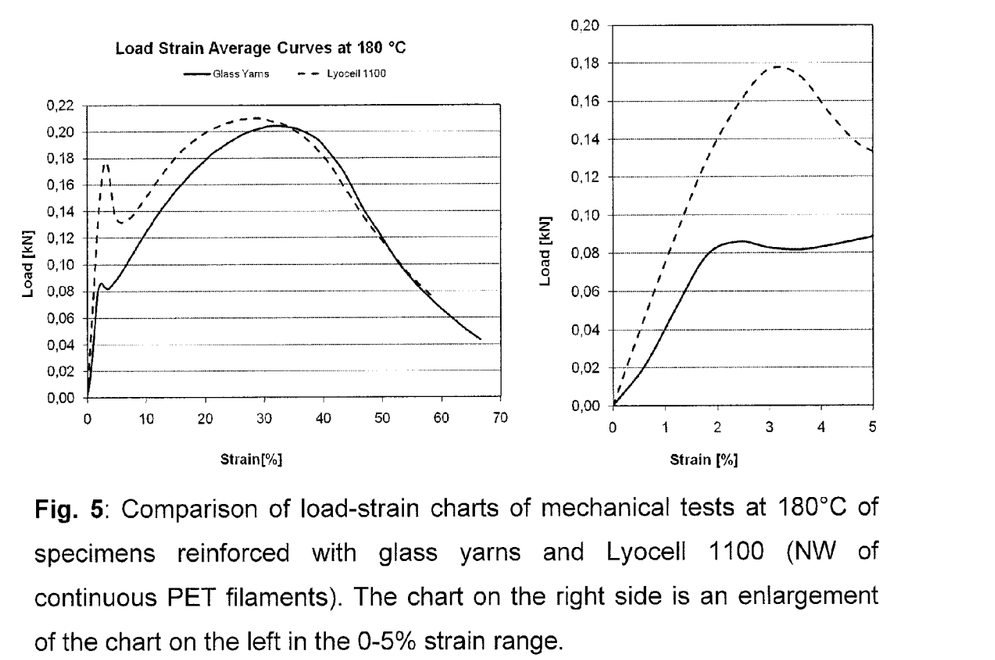
FIG. 5 shows a comparison of force-strain charts of mechanical tests at 180° C. of specimens reinforced with glass threads and Lyocell 1100.
Figure 6A:
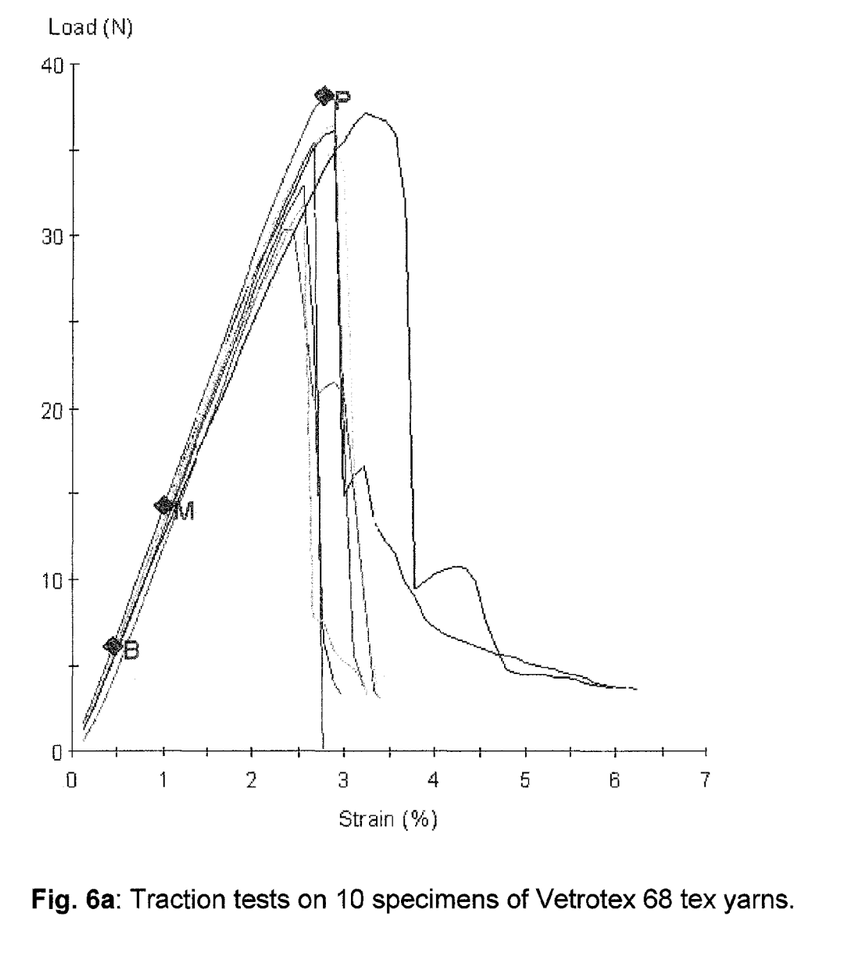
FIG. 6a shows a traction tests on 10 specimens of Vetrotex 68 tex threads.
Figure 6B:
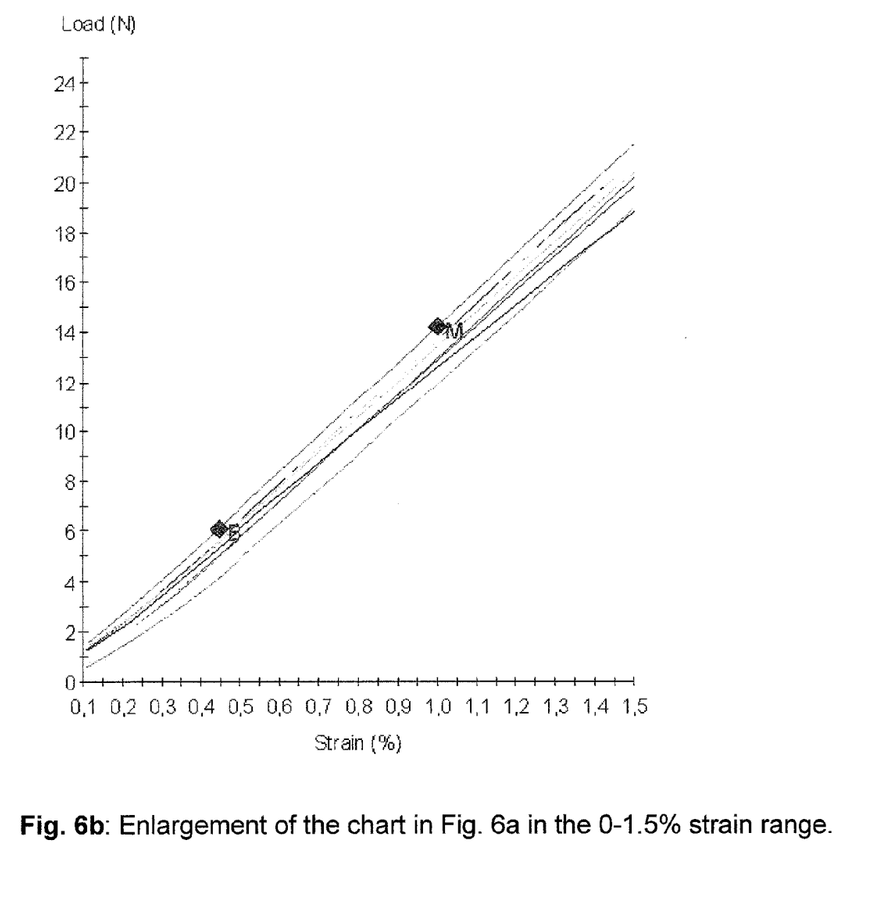
FIG. 6b shows an enlargement of the chart in Fig. 6a in the 0-1.5% strain range.
Figure 7A:
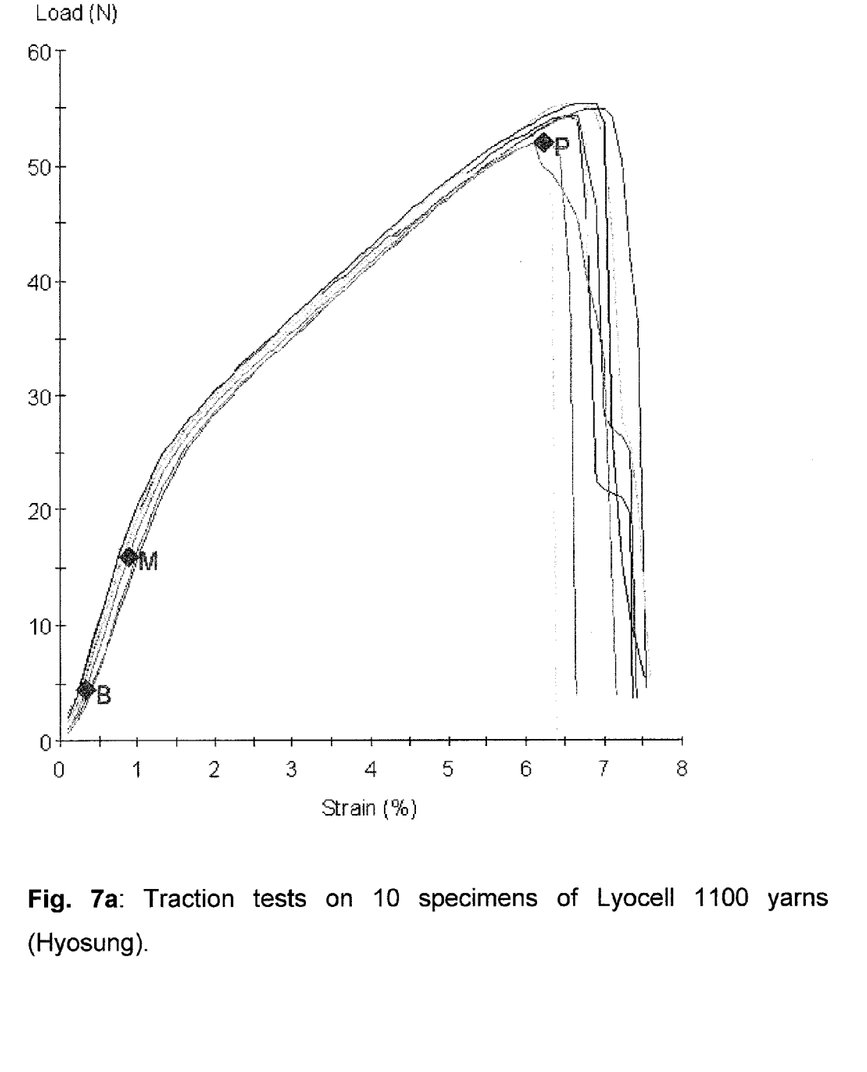
FIG. 7a shows a traction tests on 10 specimens of Lyocell 1100 threads.
Figure 7B:
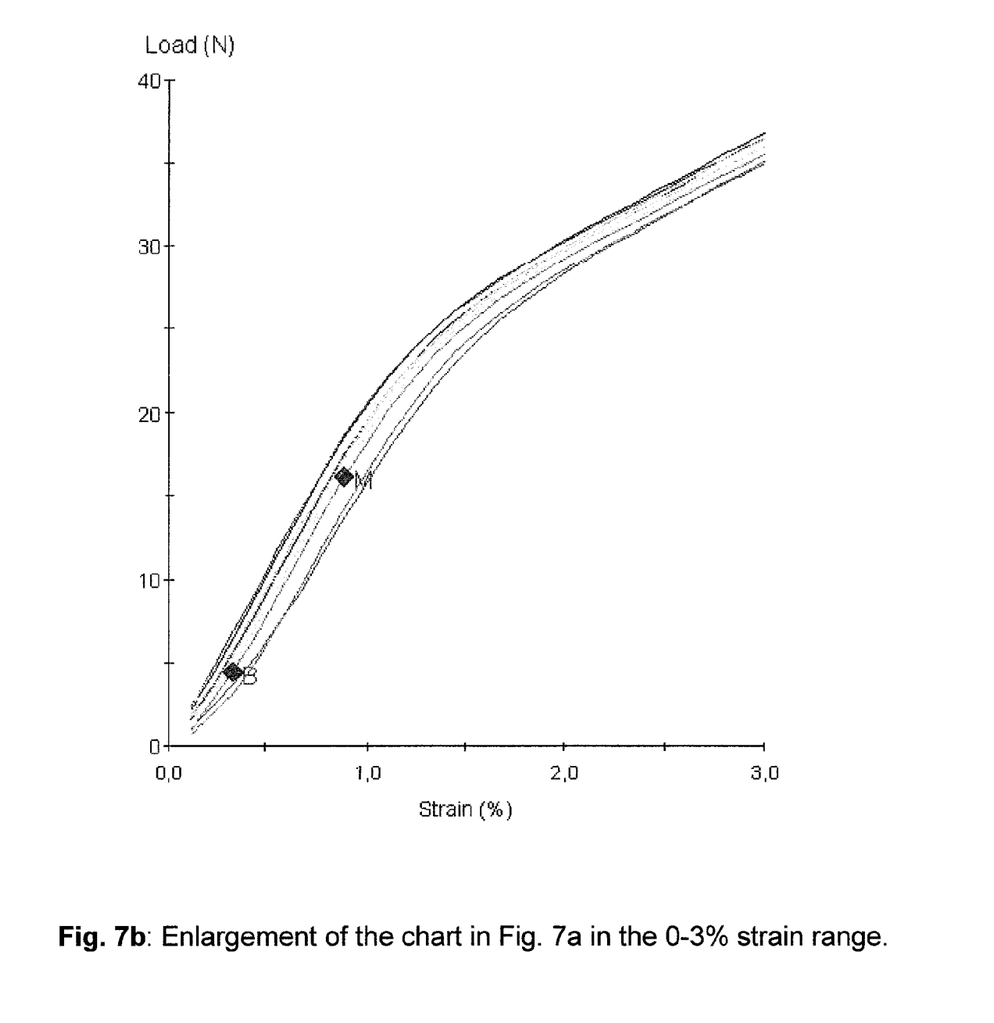
FIG. 7b shows an enlargement of the chart in Fig. 7a in the 0-3% strain range.
Figure 8A:
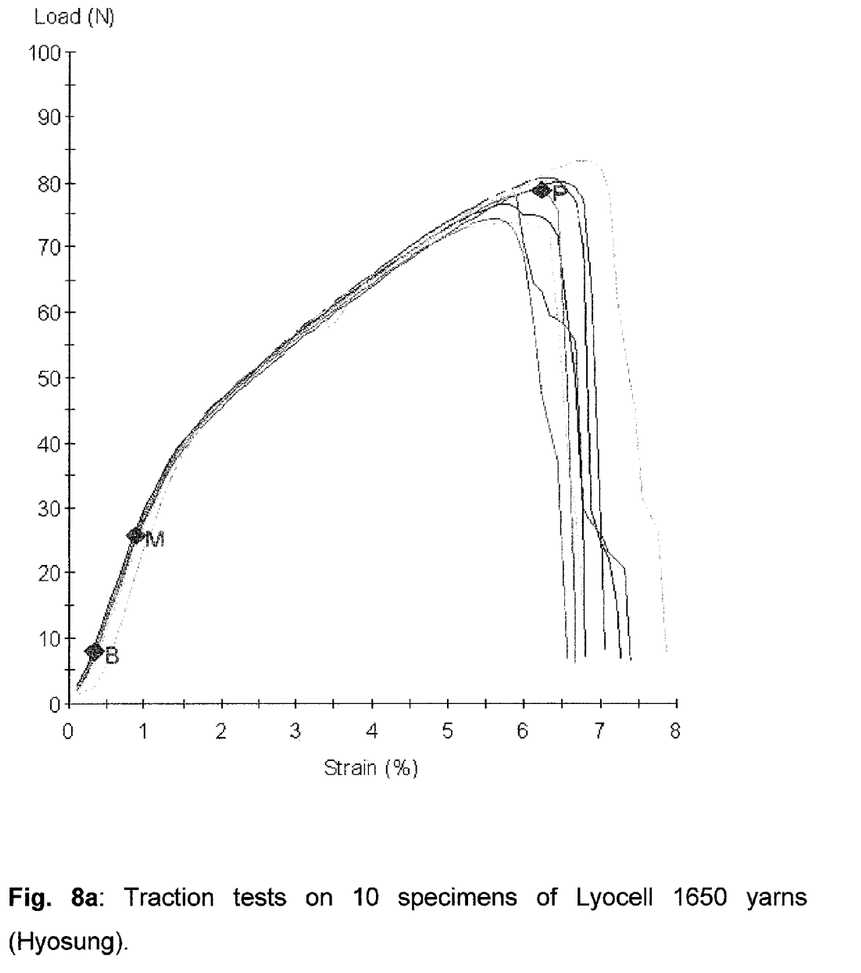
FIG. 8a shows a traction tests on 10 specimens of Lyocell 1650 threads.
Figure 8B:
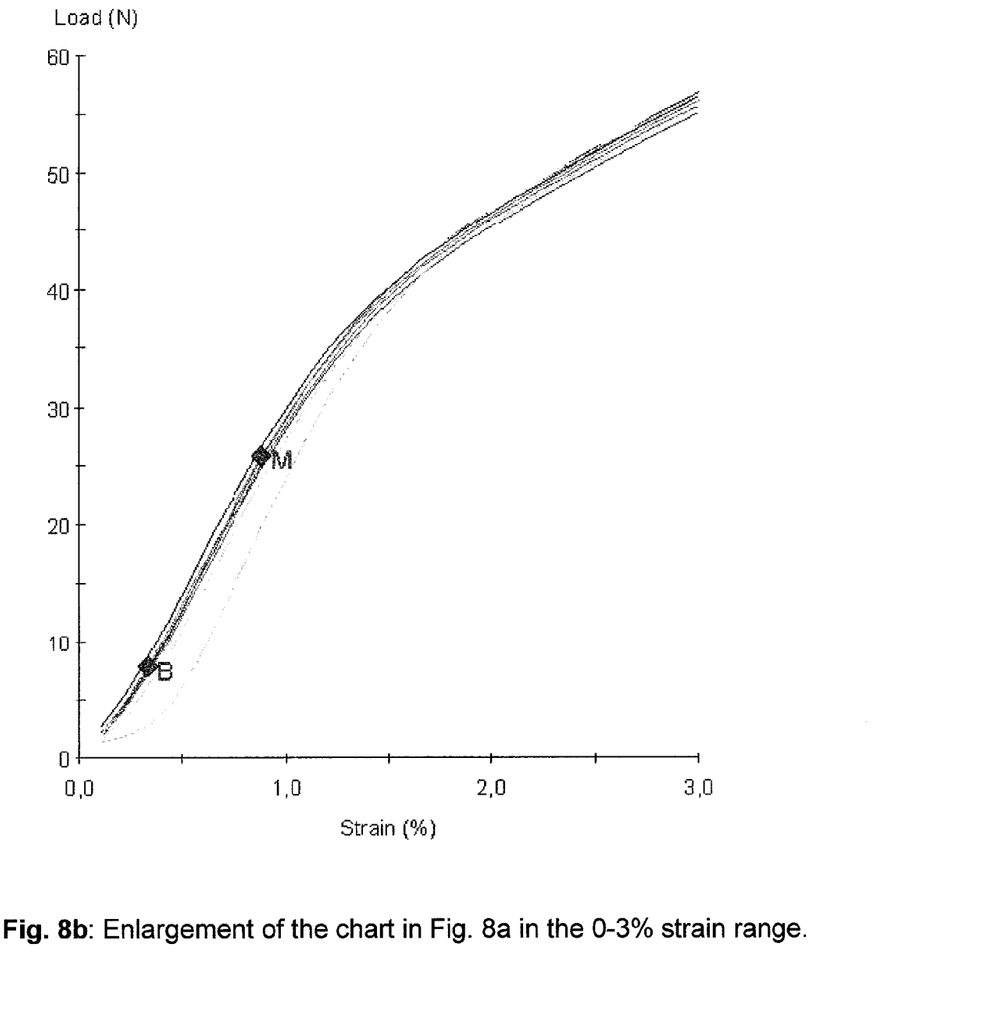
FIG. 8b shows an enlargement of the chart in Fig. 8a in the 0-3% strain range.

FIG. 5 and Tab. 4 show the results of tensile tests at 180° C.: the curve is again obtained as an average of the 5 specimens and compared with similar support reinforced with Vetrotex 68 tex glass yarns.

TAB. 4

Results of tensile tests at 180° C. of the specimens in FIG. 5.

|  | Glass | Lyocell |
|---|---|---|
| Grammage [g/m$^2$] | 201 | 196 |
| Yarn tensile strength [N/50 mm] | 93 | 180 |
| Yarn elongation at break [%] | 2.30% | 3.20% |
| Tenacity at yarn break [N/50 mm/g*m] | 0.05 | 0.09 |
| Young modulus [MPa] | 81 | 105 |
| Strain @ Load = 50 N | 1.18% | 0.65% |
| Strain @ Load = 80 N | 1.81% | 1.08% |
| Strain @ Load = 100 N | — | 1.35% |

Mechanical Properties of the Reinforcement Yarns

The Lyocell reinforcement yarns, supplied by Hyosung, were analyzed and compared with the Vetrotex glass yarn (68 tex) making different tensile tests on dynamometer MTS Qtest/5, provided with terminals and specific clamping system for yarn testing.

The properties of the different types of reinforcement yarns are summarized in the following table 5:

TAB. 5

Properties of reinforcement yarns analyzed with tensile tests.

|  | Glass | Lyocell 1100 | Lyocell 1650 |
|---|---|---|---|
| Titer [tex] | 68 | 120 | 180 |
| Diameter [mm] | 0.182 | 0.322 | 0.394 |
| Density [g/cm³] | 2.6 | 1.5 | 1.5 |
| Supplier | VSG | Hyosung | Hyosung |

These tests were carried out at room temperature at a speed of 200 mm/min using 10 specimens for each type of yarn. The load-strain curve was re-processed with Testworks 4 software (MTS). The tensile test graphs are shown in FIG. 6a-b, FIG. 7a-b and FIG. 8a-b.

Tests are carried out to yarn breaking point, which coincides with the maximum of the load-strain curve. The average values calculated for the three samples are:

TAB. 6

The tensile test results on the yarn of the specimens FIG. 6a-b, FIG. 7a-b and FIG. 8a-b.

|  | Glass | Lyocell 1100 | Lyocell 1650 |
|---|---|---|---|
| Tensile strength [N] | 35 | 53 | 79 |
| Elongation at break [%] | 2.8% | 6.4% | 6.3% |
| Tenacity at break [cN/tex] | 51.2 | 43.7 | 43.1 |
| Specific tenacity at break [cN/tex/g · cm³] | 19.7 | 29.1 | 28.7 |
| Load @ strain = 1% [N] | 13 | 17 | 27 |
| Tenacity @ Stain = 1% [cN/tex] | 19.1 | 13.9 | 14.7 |
| Specific tenacity @ strain = 1% [cN/tex/g · cm³] | 7.3 | 9.3 | 9.8 |
| Young modulus [GPa] * | 54 | 25 | 25 |

\* The Young modulus was calculated in the 0.5-1% strain range.

It is shown that although the modulus and tenacity of the Lyocell yarn are lower than those of glass, the performance of this yarn is better thanks to the lower density of cellulose.

The invention claimed is:

1. A reinforced textile support, particularly for bituminous membranes, comprising at least one layer of non woven web of synthetic fibers, and continuous high modulus reinforcement yarns longitudinally set in respect of said layer,
   wherein the reinforcement yarns have a Young modulus equal to or higher than 5 Gpa and equal to or lower than 25 Gpa,
   wherein the reinforcement yarns consist of Lyocell type cellulosic fiber multi-filaments that have a linear density comprised between 30 and 200 tex, and
   wherein every layer of the non woven web consists of continuous spun bonded polyester filaments or polyester staple fibers,
   wherein the polyester staple fibers have a linear density between 0.5 and 6 dtex.

2. The textile support according to claim 1, wherein the textile support has a basis weight between 20 and 500 g/m².

3. The textile support according to claim 1, wherein the reinforcement yarns are set at a spacing comprised between 2 and 30 mm.

4. The textile support according to claim 1, wherein the synthetic fibers have a linear density between 2.5 and 5 dtex.

5. The textile support according to claim 1, wherein the reinforcement yarns are set at a spacing between 6 and 12 mm.

6. A process for manufacturing a textile support according to claim 1, wherein the assembly that consists of the layer or layers of non woven web and of the reinforcement yarns is consolidated by means of mechanical needling and/or water entangling, stabilized by means of thermal treatment at a temperature of 200-250° C. and consolidated by means of a chemical binder.

7. The process for manufacturing a textile support according to claim 6, wherein the assembly that consists of the layer or layers of non woven web and the reinforcement yarns is consolidated by thermal means.

8. The process according to claim 6, wherein the value of the needling density is between 20 and 150 stitches/cm².

9. The process according to claim 6, wherein the chemical binder is applied by saturation.

10. The process according to claim 6, wherein the binder consists of synthetic resins and starch/cellulose based resins.

11. The process according to claim 10, wherein the content of resins is between 10 and 25% by weight relative to the total weight of the textile support.

\* \* \* \* \*